United States Patent [19]

Elgat et al.

[11] Patent Number: 5,019,458
[45] Date of Patent: May 28, 1991

[54] PROTECTED SILVERED SUBSTRATES AND MIRRORS CONTAINING THE SAME

[75] Inventors: Zvi Elgat; Joel P. Warschawski, both of Jerusalem, Israel

[73] Assignee: Luz Industries Israel, Ltd., Jerusalem, Israel

[21] Appl. No.: 340,421

[22] Filed: Apr. 19, 1989

[30] Foreign Application Priority Data

May 12, 1988 [IL] Israel ......................................... 86366

[51] Int. Cl.$^5$ ............................................. G02B 5/08
[52] U.S. Cl. ..................... 428/630; 428/632; 428/633; 428/673; 428/432; 428/433; 428/434; 350/641; 350/642
[58] Field of Search .............. 428/630, 632, 633, 673, 428/432, 433, 434; 350/641, 642; 126/417

[56] References Cited

U.S. PATENT DOCUMENTS 3,687,713  8/1972  Adams ................................. 428/632
3,978,273  8/1976  Groth .................................. 428/434
4,320,169  3/1982  Yatabe et al. ....................... 428/673

FOREIGN PATENT DOCUMENTS 2095232  2/1972  France.

Primary Examiner—R. Dean
Assistant Examiner—George Wyszomierski
Attorney, Agent, or Firm—Irell & Manella

[57] ABSTRACT

The invention provides a protected silvered substrate of the type comprising in combination, a substrate having a layer of substantially silver deposited thereon, a layer of aluminum oxide secured to the silver layer, and a layer of silicon dioxide secured to the layer of aluminum oxide, characterized by a layer of zinc sulfide between the layer of substantially silver and the layer of aluminum oxide to improve the adhesion of the alumina to the silver and front surface mirrors and low emissivity glass utilizing the same.

7 Claims, 1 Drawing Sheet

PROTECTED SILVERED SUBSTRATES AND MIRRORS CONTAINING THE SAME

BACKGROUND OF THE INVENTION

The present invention relates to protective coatings for surfaces of silver or silver alloys and especially to protected silvered substrates such as front surface mirrors and low emissivity glass utilizing the same.

As is known, e.g. from U.S. Pat. No. 3,687,713 it has been the general practice to fabricate mirrors by applying reflective metals such as silver, platinum, gold, copper, aluminum, chromium, rhodium and the like, by vacuum deposition, onto siliceous substrates such as glass and for some uses onto metal substrates and plastic substrates. Over the years it has been observed that these reflective metals do not adhere satisfactorily to siliceous substrates and that such reflective metal surfaces frequently develop pin holes or blisters and/or peel away in large areas.

Attempts have been made in the prior art to correct this problem of poor adherence by employing an overlay of protective lacquer or shellac. These attempts, for the most part, have not been satisfactory since the shellac or lacquer has not been impervious to moisture, or changes in humidity and temperature, and because overcoatings do not improve the adherence between the mirror coating and the substrate.

When such a mirror has been subjected to repeated changes of humidity and/or temperature, the reflective metal has usually blistered and peeled off. In addition a shellacked or lacquered mirror is limited in its use to a back-view mirror, most of which have been made by chemical reduction processes which are not suitable for front-view mirrors in any case.

In another attempt to correct poor adherence, a thin layer of metallic lead oxide has been bonded to a substrate and the reflective metal applied thereto. However, the metallic lead oxide mirror will not remain intact if it is subjected to cycles of humidity and temperature changes. In addition, in a back-view mirror the thickness of the metallic lead oxide necessary to provide a good adherence is sufficiently deep that an undesirable amount of incident light, passing through the metallic lead oxide layer, is attenuated. Further, the metallic lead oxide layer does not provide any advantage if it should be used as a front surface mirror.

It is known that initially the reflectivity of a vacuum deposited film of silver is greater than 95% through most of the visible spectrum as well as through a good portion of the infrared light spectrum. Despite this high reflectivity, unprotected silver has not been used successfully as a front view mirror because in addition to its poor adherence to siliceous substrates it is soft (and therefore scratches) and tarnishes easily. Thus, unprotected silver films will not stand handling and cleaning and the effects of the atmosphere, particularly the sulfides contained in the atmosphere which quickly tarnish the silver.

Especially in the solar energy field, it is often desirable to reach a high concentration of solar radiation onto a solar receiver. This is often done by means of reflectors which must be highly specular with good solar reflectivity, yet have a relatively low cost. Second surface glass mirrors using regular glass have the disadvantage of reflection losses due to the absorption of the solar radiation into the glass superstrate. Thus up to 12% of solar radiation is absorbed into 4 mm thick glass. Expensive overcoatings on the non-reflective surface of the mirror are needed in order to achieve an expected lifetime of 30 years under outdoor conditions. Regular glass can be replaced by very expensive low-iron glass, but this will increase the cost of the reflector radically, even though the reflectance will typically be improved by 7-10% in a 4 mm thick glass superstrate. Again, the expensive lacquer remains on the non-reflective surface to protect the metal film.

The use of highly reflective front surface mirrors eliminates the need for expensive low iron glass to reach high reflectivity and expensive lacquer for back protection. Maximum reflectivity is typically improved by 2%. Alternatively, a plastic substrate can be employed when using front surface mirrors, as the problem of UV stabilization and transparency does not have to be dealt with. There is an additional advantage in that currently many mirrors use glued mounting elements to attach the reflectors to the mechanical structure. This mounting element is glued onto the protective coating of the mirror, which causes adhesion problems. With front surface reflectors, the mounting element can be directly connected to the glass substrate, or alternatively, can be a built-in element of an injected plastic substrate, which is far simpler and very much more secure.

Many previous works exist on Front Surface Mirrors. As high solar reflectivity is required, only silver and aluminium reach a solar reflectivity high enough to be good candidates as reflecting surfaces. Solar reflectance of unprotected freshly evaporated aluminium is less than 92%, and of freshly evaporated silver almost 98% (AM 1). At AM 1.5 solar spectrum, this last value will be even higher. Therefore silver is chosen as the reflecting surface. However, silver tarnishes quite easily due to atmospheric effects and therefore needs to be protected from mechanical and chemical attacks. Mechanical and optical properties of dielectric films have been investigated in the past and alumina ($Al_2O_3$) and quartz ($SiO_2$) films have shown very high levels of hardness and transparency in the solar spectrum, as described in Reflectance and Preparation of Front Surface Mirrors for Use at Various Angles of Incidence from the Ultraviolet to the Far Infrared. G. Hass. Jour. Opt. Sc. Am. Vol. 72 (January 1982)

Different ways of applying this kind of material have been studied, in particular evaporation, sputtering and electron beam techniques as described in the above article and by J. T. Cox, H. Hass, J. B. Rawsey. Improved Dielectric Films for Multilayer Coatings and Mirror Protection, Journal de Physique. Vol. 25 (January–February 1964).

In U.S. Pat. No. 3,687,713 there is described and claimed a protective coating means on a substrate, comprising in combination, a substrate having an outer surface of substantially silver, a layer of aluminum oxide secured to said outer surface, and a layer of silicon dioxide secured to said layer of aluminium oxide.

According to said patent the protective coatings of $Al_2O_3$ and $SiO_2$ result in good durability to abrasion and insensitivity to moisture and other environmental conditions, which normally affect such devices.

The design used in said patent is based on several properties of different materials. First the silver is secured to the substrate. If using glass or $SiO_2$ substrate, a first layer of chromium and nickel alloy or alumina is recommended for use. After applying the silver, a protective layer of alumina is deposited. This layer is very hard but is sensitive to moisture because of its high porosity. The multilayer is then coated with a thin layer of quartz that "seals" the mirror and protects it from moisture attack. The thickness of the different layers must be adapted according to the trade-off between mechanical (thick) and optical (thin, interference effects) performance.

Having prepared several mirrors of this kind it was found, as described also in comparative example 3 hereinafter, that the coating peels off under outdoor use especially as a result of failure of this alumina-silver bond.

SUMMARY OF THE INVENTION

According to the present invention it has been found that a thin layer of zinc sulfide (ZnS) dramatically improves the adhesion of the protecting layer to the silver.

Thus the present invention provides a protected silvered substrate of the type comprising in combination, a substrate having a layer of substantially silver deposited thereon, a layer of aluminum oxide secured to said silver layer, and a layer of silicon dioxide secured to said layer of aluminium oxide, characterized by a layer of zinc sulfide between said layer of substantially silver and said layer of aluminum oxide to improve the adhesion of said alumina to said silver.

DETAILED DESCRIPTION

In U.S. Pat. No. 1,977,639 there is described silver deposited on a glass which is then coated with cobalt, nickel, or ferrous sulphate followed by a copper overcoating.

In U.S. Pat. No. 2,759,845 there is disclosed a copper sulphate coating on silver during the production of a mirror. In U.S. Pat. No. 2,585,128 there is described the deposition of platinum, palladium, nickel, cobalt or chromium between a layer of aluminum oxide and silver to increase adhesion.

None of said references, however, teach or suggest the addition of a layer of zinc sulfide between layers of silver and aluminum oxide to improve adhesion of the alumina to the silver.

Figure 1:
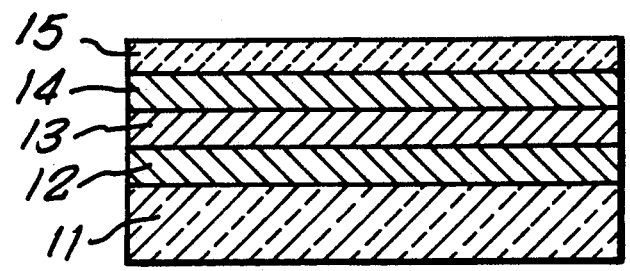
FIG. 1 is a cross section of one embodiment of a protected silvered substrate or mirror in accordance with the invention.

In its preferred embodiment as shown in FIG. 1 the present invention provides a front surface mirror of the type having a protective coating means on a substrate, comprising in combination, a substrate 11 having an outer surface 12 of substantially silver, a layer 14 of aluminum oxide secured to said outer surface, and a layer 15 of silicon dioxide secured to said layer of aluminium oxide characterized by a layer 13 of zinc sulfide between said outer surface of substantially silver and said layer of aluminum oxide to improve the adhesion of said alumina to said silver.

The invention also provides a weather and abrasion resistant front surface solar concentrator mirror comprising a substrate having an outer surface of substantially silver, a layer of zinc sulfide secured to said outer surface, a layer of aluminum oxide secured to said layer of zinc sulfide and a layer of silicon dioxide secured to said layer of aluminum oxide.

As stated it is preferred to provide a layer of chromium nickel alloy to act as an adhesion layer between the substrate and the silver layer.

As known in the art said silver layer can be substantially pure silver or said silver layer can be comprised of a silver metal alloy selected from the group: nickel-chromium-iron-silver, chromium-nickel-silver and chromium-silver.

It has also been found that by applying the oxides $Al_2O_3$ and $SiO_2$ on the ZnS adhesion layer, a remarkable performance of the mirror is achieved. It is possible to protect the silver against all weather effects and against rough abrasion of sand, and at the same time maintain the high reflectivity of the overall mirror stack.

As will be realized the innovation of the present invention is the provision of a multilayered protected silvered substrate using ZnS for adhesion enhancement independently of the silver thickness. However, because different production techniques and different uses for the final product exists, the protective layer can be made of one of the oxides only ($Al_2O_3$ or $SiO_2$). depending on the specification of the final product.

Although a preferred embodiment of the invention is a reflective solar concentrator, it is applicable to any Ag protective layer such as that used in Low E (low emissivity) glass. The purpose of this architectural glass is to maintain the interior temperature of a heated room in winter by means of IR radiation reflection, and to keep the room cool in summer by means of partial solar reflectivity, especially the IR component, whilst maintaining a relatively high level of visible light transmission. For Low E glass, the Ag layer is in the 50-200 A range, depending on the amount of visible light to be transmitted, however, it is manufactured in a similar fashion to that of solar concentrator mirrors as described hereinafter.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

The following describes in detail the process by which front surface mirrors are prepared. In the process described below, the mirrors are created on glass substrates, although it is not restricted to glass only. The same mirror can be created using any type of flat surface as substrate, e.g. sheet metals of aluminum or steel, flat plastic sheets or their equivalent.

EXAMPLE 1 a) Cleaning: When using a glass substrate, the glass substrate needs to be thoroughly chemically cleaned prior to deposition. This is achieved by regular methods available for commercial glass such as Alcovox ® or its equivalents.

b) Deposition: Deposition of the thin film front surface mirror is carried out in a process chamber. The normal working conditions for thin film production requires that the chamber be vacuum pumped to base pressure of about $1 \times 10^{-6}$ torr. After base pressure has been achieved and the chamber, containing the substrate, pumped to the required value, the deposition process can start. The process consists of applying several layers of thin materials onto the substrate in the sequence described below.

Figure 2:
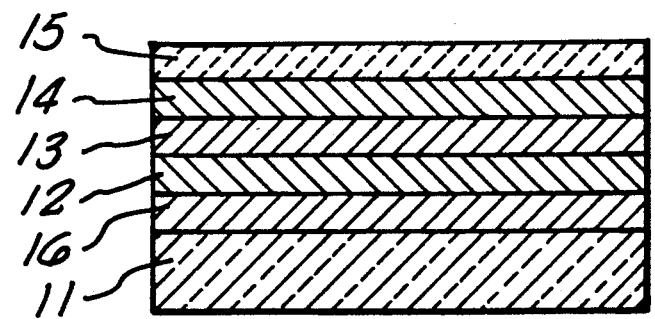
FIG. 2 is a cross section of an alternate embodiment of a protected silvered substrate or mirror in accordance with the invention.

1. Referring now to FIG. 2, the first layer to be deposited is about 100 angstrom thick film of NiCr 16, whose function is to act as an adhesion layer between the glass substrate 11 and the second layer 12 which is the silver reflector layer.

This NiCr layer is deposited using regular DC sputtering technique from a NiCr specially prepared sputtering target.

Pressure during the sputtering process is $5 \times 10^{-3}$ torr of 99.995 Ar.

2. The second layer 12 to be deposited is 700-1000 angstrom thick high reflectivity silver. This is the reflector layer whose function is to reflect solar spectrum radiation with high specularity and reflectance of about 97%.

The silver is deposited using sputtering under the same conditions as the previous NiCr layer.

3. The third layer 13 to be deposited is about 100 angstrom thick ZnS film whose function is to act as an adhesion layer between the silver reflector layer and the oxide protective layers on top.

It is essential to the whole stack of the mirror to have the ZnS layer on top of the silver; without this, the protection of the silver against weather effects is totally inadequate. Oxide layers such as $SiO_2$ or $Al_2O_3$ which have been proven as reliable protection against oxidation and tarnishing of silver do not adhere well to silver and tend to peel off. Only by inserting a very thin layer of ZnS is it possible to create good adhesion of the above oxides to the silver and thus provide an overall protected layer as shown in Example 2 and comparative Example 3 hereinafter.

In addition to being an adherent agent, the protective film must be completely transparent to solar radiation so that it does not reduce the overall reflectance by absorption. The about 100 angstrom thick ZnS layer is both 100% absorption free and acts as a good adhesion layer between the silver and the oxides on top.

The ZnS layer is deposited with DC sputtering under the same conditions as the silver and NiCr layers.

4. The fourth layer 14 is about 1 micron thick of $Al_2O_3$ (aluminum oxide) which is the main protection layer for the whole stack. Aluminum oxide is widely used as a protection layer since it is one of the hardest materials known and it presents absorption free film. The $Al_2O_3$ film protects the silver against adverse weather effects and against rough abrasion such as sand storms or brush cleaning of the mirror.

The $Al_2O_3$ is deposited using electron beam evaporation process or the cathodic arc process. Electron beam evaporation is carried out in the process chamber with a pressure of $1 \times 10^{-6}$ torr. Cathodic arc process is carried out in the process chamber at pressure of $5 \times 10^{-3}$ torr partial pressure of Ar and $O_2$ mixture.

5. The $Al_2O_3$ layer deposited with electron beam evaporation or cathodic arc deposition is sometimes not dense enough to be complete protection, and to account for that, another layer 15 of $SiO_2$ on top of $Al_2O_3$ is required. The $SiO_2$ is deposited using one of the techniques as described for the $Al_2O_3$. This would be about 1000-5000 angstrom thick layer of $SiO_2$ which provides the "sealing" of the porous $Al_2O_3$ film.

The exact thickness of the last two layers is optimized to bring the interference effects to a minimum value in terms of solar reflection value.

EXAMPLE 2

Several front surface solar concentrator mirrors were prepared according to the present invention with the following layers and subjected to extensive testing with the following results:

a) Description of mirror: glass substrate

| |
|---|
| $Al_2O_3$ or NiCr: 100 A |
| Ag: 650 A |
| ZnS: 50 A |
| $Al_2O_3$: 1.5 um |
| $SiO_2$: 1900 A | b) Performance

Solar reflectance $=95.5\%$

Withstands eraser according to MIL-C-675 with no damage.

Withstands salt fog according to MIL-C-675 with no damage.

Withstands humidity 95-100% RH, 140° F. for more than a week with no damage.

Withstands 100 cycles of brush cleaning, with sand, dry and wet, with no damage.

Withstands 1 year of outdoor exposure in Jerusalem area, in Negev desert and in Mojave desert with less than 0.5% maximum decrease in solar reflectivity. (Most samples show negligible loss of reflectivity).

COMPARATIVE EXAMPLE 3

Several front surface solar concentrator mirrors were prepared in accordance with the description and example of U.S. Pat. No. 3,687,713 with the following layer and subjected to testing with the following a) Description of mirror: glass substrate

| |
|---|
| NiCr: 400-500 A |
| Ag: 700-1000 A |
| $Al_2O_3$: 1.7 um |
| $SiO_2$: 1000-1100 A | b) Performance

Solar reflectance according to graph in the Patent: $\pm 97\%$

Withstands humidity test to patent—24 hours, 95-100% RH, 120° F.),

Withstands 100 cycles of brush cleaning, with sand, dry and wet, with no damage.

Totally peeled after several days of outdoor exposure. Failure in the $Ag/Al_2O_3$ boundary. according to experiments and examination of peeled mirror.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A protected silvered substrate comprising in combination, a substrate having a layer of substantially silver deposited thereon, a layer of aluminum oxide secured to said silver layer, and a layer of silicon dioxide secured to said layer of aluminum oxide, and including a layer of zinc sulfide between said layer of substantially silver and said layer of aluminum oxide to improve the adhesion of said alumina to said silver, and further including a layer of $Al_2O_3$ or chromium-nickel alloy between said substrate and said layer of substantially silver to improve the adhesion of said silver layer to said substrate.

2. A protected silvered substrate according to claim 1 wherein said silver layer is substantially pure silver.

3. A protected silvered substrate according to claim 1 wherein said silver layer is comprised of a silver metal alloy selected from the group: nickel-chromium-iron-silver, chromium-nickel-silver and chromium-silver.

4. A protected silvered substrate according to claim 1 wherein said $Al_2O_3$ and $SiO_2$ are deposited using sputtering, electron beam evaporation and/or cathodic arc plasma deposition techniques.

5. A weather and abrasion resistance front surface solar concentrator mirror comprising a substrate having a layer of substantially silver, deposited on the outer surface thereof, a layer of zinc sulfide secured to said silver layer, a layer of aluminum oxide secured to said layer of zinc sulfide and a layer of silicon dioxide secured to said layer of aluminum oxide, and further including a layer of $Al_2O_3$ or chromium-nickel alloy between said substrate and said layer of substantially silver to improve the adhesion of said silver layer to said substrate.

6. Low-emissivity glass comprising a pane of glass having a layer of about 50 A–200 A silver deposited on the outer surface thereof, a layer of zinc sulfide secured to said silver layer, a layer of aluminum oxide secured to said layer of zinc sulfide and a layer of silicon dioxide secured to said layer of aluminum oxide, and further including a layer of $Al_2O_3$ or chromium-nickel alloy between said pane of glass and said layer of silver to improve the adhesion of said silver layer to said pane of glass.

7. A weather and abrasion resistant front surface mirror comprising a substrate having a layer of substantially silver deposited on the outer surface thereof, a layer of zinc sulfide secured to said silver layer and a layer of aluminum oxide secured to said layer of zinc sulfide, and further including a layer of $Al_2O_3$ or chromium-nickel alloy between said substrate and said layer of substantially silver to improve the adhesion of said silver layer to said substrate.

* * * * *